(12) United States Patent
Morein et al.

(10) Patent No.: US 7,924,281 B2
(45) Date of Patent: Apr. 12, 2011

(54) SYSTEM AND METHOD FOR DETERMINING ILLUMINATION OF A PIXEL BY SHADOW PLANES

(75) Inventors: Stephen L. Morein, Cambridge, MA (US); Larry D. Seiler, Boylston, MA (US); Michael Doggett, Southborough, MA (US); Jocelyn Houle, Longueuil (CA)

(73) Assignee: ATI Technologies ULC, Markham, Ontario (CA)

( * ) Notice: Subject to any disclaimer, the term of this patent is extended or adjusted under 35 U.S.C. 154(b) by 1684 days.

(21) Appl. No.: 10/906,852

(22) Filed: Mar. 9, 2005

(65) Prior Publication Data

US 2006/0202941 A1    Sep. 14, 2006

(51) Int. Cl.
  *G06T 15/50*    (2006.01)
(52) U.S. Cl. .......................... 345/426; 345/419; 345/420
(58) Field of Classification Search .................. None
  See application file for complete search history.

(56) References Cited

U.S. PATENT DOCUMENTS

| | | | |
|---|---|---|---|
| 5,870,097 A * | 2/1999 | Snyder et al. ................. | 345/426 |
| 6,118,452 A | 9/2000 | Gannett | |
| 6,573,893 B1 | 6/2003 | Naqvi et al. | |
| 6,650,327 B1 | 11/2003 | Airey et al. | |
| 6,731,289 B1 | 5/2004 | Peercy et al. | |
| 6,791,544 B1 * | 9/2004 | Hong et al. ................... | 345/426 |
| 6,809,732 B2 | 10/2004 | Zatz et al. | |
| 6,980,209 B1 * | 12/2005 | Donham et al. ............. | 345/426 |
| 7,456,846 B1 * | 11/2008 | King et al. .................... | 345/613 |
| 2002/0126090 A1 * | 9/2002 | Kirkpatrick et al. .......... | 345/158 |
| 2004/0164987 A1 | 8/2004 | Aronson et al. | |
| 2004/0257365 A1 * | 12/2004 | Robart .......................... | 345/426 |
| 2006/0232596 A1 * | 10/2006 | Barenburg et al. ........... | 345/581 |

OTHER PUBLICATIONS

Brabec, S., Seidel, H., "Single Sample Soft Shadows using Depth Maps", 2002, Graphics Interface, pp. 219-228.*

* cited by examiner

*Primary Examiner* — Said Broome
(74) *Attorney, Agent, or Firm* — Vedder Price P.C.

(57) ABSTRACT

A graphics processing circuit includes a pixel shader operative to provide pixel color information in response to image data representing a scene to be rendered; a texture circuit, coupled to the pixel shader, operative to determine a luminance value to be applied to a pixel of interest based on the luminance values of the pixels that define a plane including the pixel of interest; and a render back end circuit, coupled to the texture circuit, operative to compute the luminance values from a shadow map that specifies the distance from the light source of the nearest object at a plurality of locations. A pixel illumination method includes receiving color information for a pixel to be rendered, defining a plane containing at least one pixel of interest, the plane including a plurality of planar values; comparing the plurality of planar values to a corresponding set of distance values; determining a luminance value for the at least one pixel of interest; and applying the luminance value to the at least one pixel of interest.

11 Claims, 4 Drawing Sheets

SYSTEM AND METHOD FOR DETERMINING ILLUMINATION OF A PIXEL BY SHADOW PLANES

FIELD OF THE INVENTION

The present invention generally relates to graphics processing circuitry and, more particularly, to a system and method for determining the luminance of a pixel within an image.

BACKGROUND OF THE INVENTION

In computer graphics applications, complex shapes and structures are formed through the sampling, interconnection and rendering of more simple shapes, referred to as primitives. An example of such a primitive is a triangle, or other suitable polygon. These primitives, in turn, are formed by the interconnection of individual pixels. Objects are generated by combining a plurality of pixels together to form a shape (e.g. a cup). Physical attributes, such as color and texture are then applied to the individual pixels based on their location within the primitive and the primitives' orientation with respect to the generated shape. Several objects may be used to create a larger image.

To enhance the presentation of the image, lighting (e.g. luminance value) may be applied to the pixels of the several objects contained within the image. The amount of lighting, or luminance, to be applied to a particular pixel is determined from the point of view of a light source. Conventionally, this is done by determining the angle between rays traced from the light source to the particular point of interest and the angle from the point of interest to the eye position. Typically, the point of interest is at the center of the pixel being illuminated. Such angle and luminance determinations are performed by graphics processor circuitry. The luminance to be applied to a pixel of interest is also affected by the actual visibility of the light source. That visibility can be determined by observing a ray, for example, a line segment linking the light source to the pixel of interest. If an object intersects the ray, then the pixel of interest is in shadow, and the light does not contribute directly to the luminance value of the pixel of interest. Thus, the luminance value associated with a given pixel is determined by objects that are between the light source and the particular pixel of interest.

FIG. 1 is a representative side view of a conventional method for determining the luminance of a pixel of interest within an image. The rendered image includes an object 12 being illuminated by a light source 14. The object 12 can be either static (e.g. a tree) or moving (e.g. a ball) as viewed in eye space from the vantage point of a hypothetical eye 15. A pixel I (to the left of the object 12) will be partially illuminated (e.g. in shadow), while pixel P1 will be fully illuminated.

One distinguishing characteristic between pixels in shadow and pixels in the light is the amount of luminance (i.e. light) that is applied to the pixels. Since the ray d from light source 14 to pixel P1 does not intersect any objects, pixel P1 receives illumination from the light source. The luminance value to be applied to the several pixels that comprise an image is a function of whether they are in shadow and the distance between the pixels and the light source 14 as determined from the point of view of the light source 14 (e.g. in light space). The distance used in performing luminance calculations is the straight-line distance (d) between a particular pixel of interest, for example, P1 and the light source 14.

A drawback associated with conventional luminance calculation methods is that they only allow two choices: the pixel is lit or the pixel is in shadow. This produces aliasing artifacts when the ray from the pixel of interest to the light source passes near an edge of the object, since this produces an abrupt transition between pixels that are illuminated and pixels that are in shadow.

standard luminance calculation methods compare multiple rays to the light source from positions near the pixel of interest. Thus pixels P2 and P3, which are near pixel P1, also contribute to the luminance value at pixel P1, depending on whether any of them are in shadow, that is, depending whether the rays between them and the light source intersect some other object. The comparison results may be used to determine a visibility factor for the pixel of interest. For example, 32 separate rays could be tested and averaged, and if N of them do not intersect another object, the pixel of interest could be marked as being N/32nds visible. The illumination based on the angles and distance could then be multiplied by N/32, resulting in a smooth transition between pixels that are entirely in shadow to pixels that are fully illuminated. The intersection tests could be performed geometrically by computing multiple rays and comparing each ray to each object in the scene, but that is very costly.

A serious drawback associated with conventional luminance calculation methods is that the luminance value is based on a constant straight-line distance (d). Thus, as you move distance d, from pixel to pixel, you traverse a line 16 that at some point is no longer in the same plane as the pixel of interest. Consequently, rays to the light source from pixels P2 and P3 appear to intersect an object in the scene, since they intersect the ground plane containing pixel P1. This is referred to as self-shadowing. Self-shadowing results in unwanted aliasing and/or distortions to be present within the resulting rendered image, as the luminance values for the pixels that lie below the plane of the pixel of interest will be incorrectly included as shadowed pixels in calculating the luminance value of the pixel of interest; thereby, causing the pixel of interest to have less luminance than it actually should. As illustrated in FIG. 1, self-shadowing causes pixels at positions that should be illuminated (e.g. P2, P3) to be placed in shadow (e.g. or be given little luminance) as the constant linear distance of line 16 places those corresponding pixels at locations below the plane of the object in the image that contains P1, the pixel being illuminated. Stated differently, the pixels (P2, P3) will no longer be in the same plane as the pixel of interest (e.g. P1); thereby adversely affecting the luminance value of P1.

An alternative method to ray casting techniques, the Shadow Buffer algorithm, renders a scene as if it were viewed from the position of the light source and computes the distance from the light source to the nearest object along each ray, using a standard depth buffer algorithm that is known in the art. The resulting set of depth values is called a shadow buffer or shadow map. To perform the intersection test, the shadow buffer algorithm computes the distance from the light source at the point of interest and compares it to the depth values stored in the shadow buffer that are near the ray that passes from the point of interest to the light source. If the distance from the light source to the point of interest is greater than the depth recorded in the shadow buffer, then the nearby ray is shadowed, since it intersects an object that is closer to the light than the point of interest.

A drawback associated with the Shadow Buffer algorithm is that a single depth value at the point of interest is compared to multiple nearby depth values in the shadow buffer. This results in the same inaccurate luminance value determinations as described above, since the object that the pixel is part of typically is not perpendicular to the light source. Therefore, each of the nearby vectors should compute a different distance to the light source. Failing to do this again causes the artifact called "self shadowing", in which a point of interest is shadowed by the object that it is part of. Conventional solutions to this problem reduce the distance d to the light source by the expected amount of self-shadowing. This reduces but may not entirely eliminate self-shadowing. It also produces artifacts that remove shadows when objects are close to each other.

BRIEF DESCRIPTION OF THE DRAWINGS

The present invention and the associated advantages and features provided thereby, will be best understood and appreciated upon review of the following detailed description of a preferred embodiment of the invention, taken in conjunction with the following drawings, where like numerals represent like elements, in which.

DETAILED DESCRIPTION OF A PREFERRED EMBODIMENT

Briefly stated, a graphics processing circuit includes geometry processing logic, which determines the pixels covered by each primitive and a pixel shader operative to provide pixel color information in response to primitive data representing a scene to be rendered. A texture circuit is coupled to the pixel shader and supplies color values to the pixel shader for use in computing the pixel color. In this invention, the texture circuit is also operative to determine the luminance value to be applied to a pixel of interest based on the luminance values of pixels that define a plane including the pixel of interest. A render back end circuit is coupled to the pixel shader to combine pixel colors computed by the pixel shader with pixel values in memory. In this invention, it is also bound to the texture circuit, and is operative to provide the luminance value to the pixel of interest. Note that it is not required for the luminance logic described below to be implemented by placing it partly in the existing render backend circuit and partly in the existing texture circuit. This is simply one possible implementation which in many cases is the most efficient implementation.

The illumination computation operates by defining a plane containing the pixel of interest for each pixel contained in each primitive, where the plane corresponds to the orientation of the primitive that contains the pixel of interest. Next, a plurality of luminance values are computed for positions on the plane, by comparing the distance from the light source on the plane to a stored shadow buffer that specifies the distance to the light source of the closest object at each position. The plurality of luminance values are combined to produce a luminance value for the pixel of interest. Then, the determined luminance value is applied to the pixel of interest in order to compute the resulting color at that pixel.

By employing the graphics processing circuit and luminance value determination method of the present invention, the self-shadowing and aliasing effects associated with conventional fixed-line distance luminance determination methods are substantially eliminated. This occurs because the luminance values are computed at locations along the plane of the surface containing the pixel of interest, rather than choosing positions at equal distances from the light source. An exemplary embodiment of the present invention will now be described with reference to FIGS. 2-4.

Figure 1:
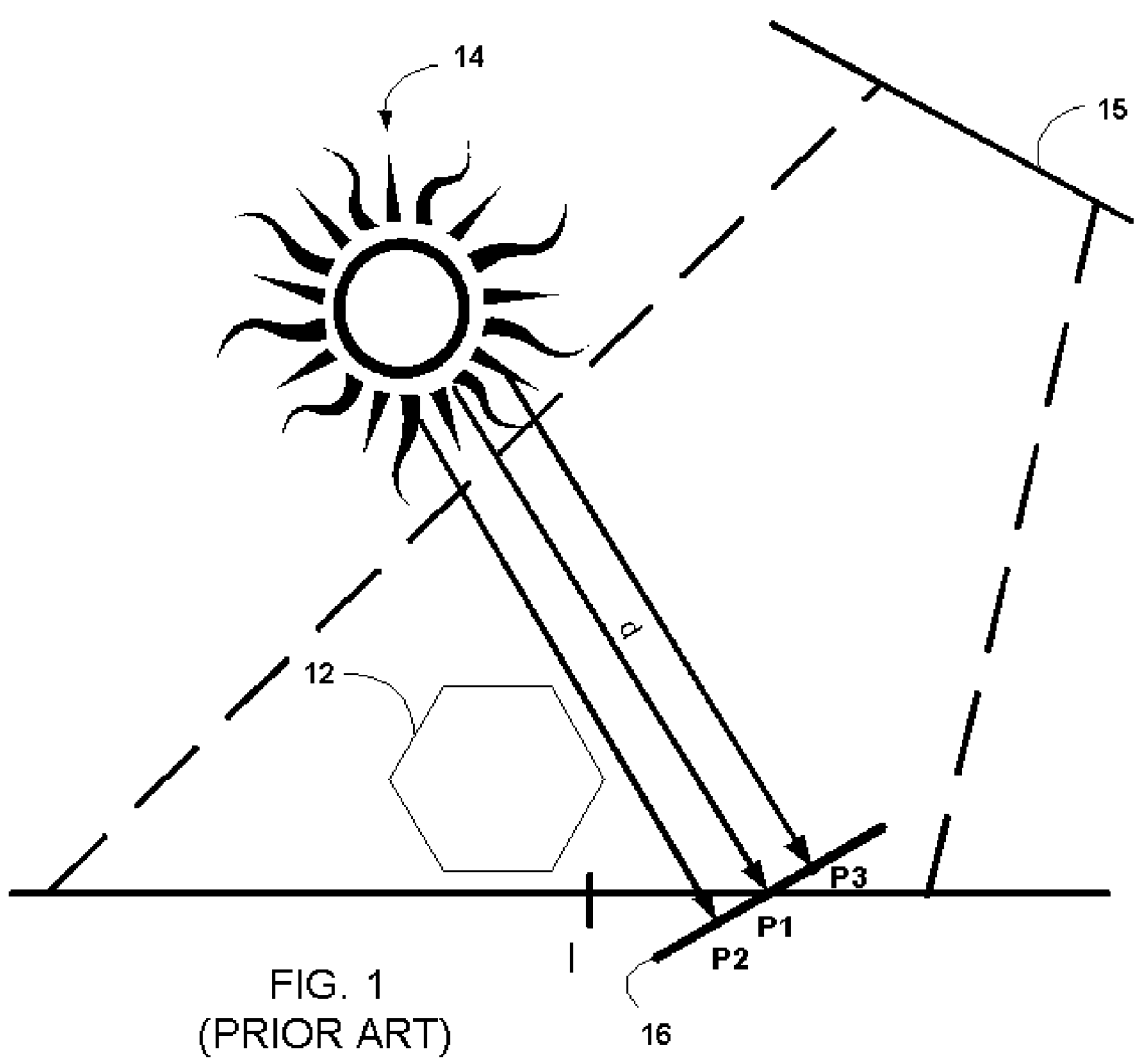
FIG. 1 is a representative side view of a conventional method for determining the luminance of a pixel of interest within an image.
Figure 2:
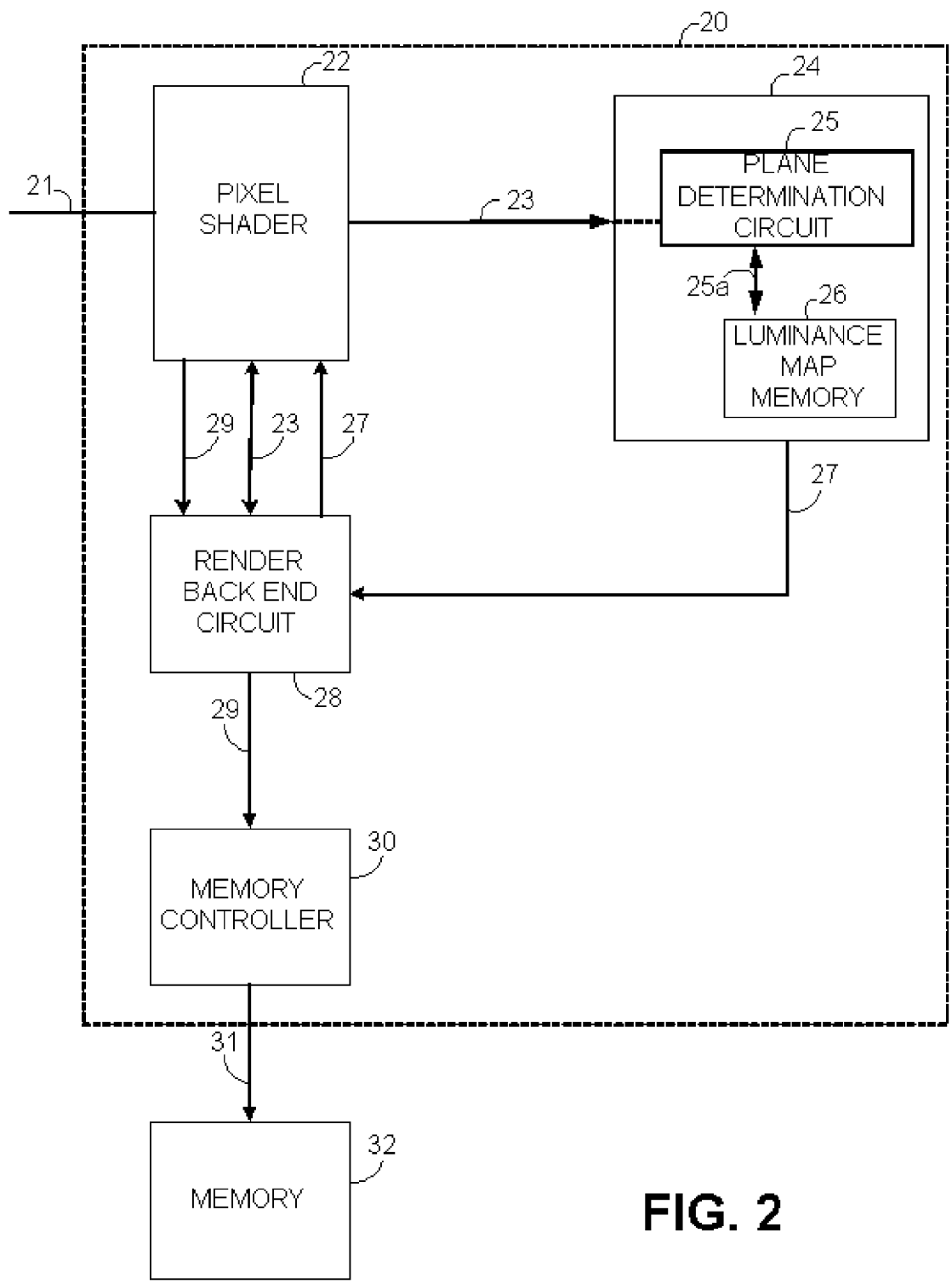
FIG. 2 is a partial schematic block diagram of one example of a graphics processing circuit that performs the luminance determination method according to one embodiment of the present invention.

FIG. 2 is a partial schematic block diagram of one embodiment of a graphics processing circuit 20 operative to perform the luminance value determination method according to the present invention. The graphics processing circuit 20 includes a pixel shader 22, for example, the pixel shader disclosed in commonly assigned, co-pending application Ser. No. 10/718, 318, Morein et al. as inventors, entitled "Graphics Processing Architecture Employing a Unified Shader", filed Nov. 20, 2003, which is incorporated fully herein, a texture circuit 24, including a plane determination circuit 25 of the present invention, operative to determine the luminance value to be applied to a pixel of interest, a cache 26 that stores selected luminance values, here referred to as a luminance map, a render back end circuit 28 operative to compute the luminance map for the plurality of locations on the plane determined in the texture circuit, and a memory controller 30.

A memory 32 is coupled to the graphics processing circuit 20, and is operative to maintain processed pixel data 31 provided by the memory controller 30 for subsequent presentation on a suitable display device (not shown). Although the memory 32 is illustrated as being off-chip (e.g. not on the chip including the graphics processing circuit 20), one of ordinary skill in the art will recognize and appreciate that the memory 32 may be formed on-chip. The memory 32 may include a single memory device or a plurality of memory devices, either connected directly to the chip containing the memory controller, or connected via a bus that transfers memory read/write requests to memory located elsewhere.

The pixel shader 22 may include arithmetic circuitry and logic circuitry, for example, arithmetic logic units (ALUs), digital signal processors (DSPs), discrete logic (e.g. AND, OR) circuits, state machines or any other suitable hardware or combination thereof operative to provide pixel position information 23 in response to image data 21 representing a scene to be rendered. The image data 21 may be provided by a processor (not shown), for example a host processor under the control of a suitable application program.

The texture circuit 24 includes a plane determination circuit 25 and a luminance map memory 26. The plane determination circuit 25 may include arithmetic circuitry and logic circuitry, for example, ALUs, DSPs, discrete logic circuits, state machines or any other suitable hardware or combination thereof or a software algorithm executing on a host processor, operative to determine pixel planar values 27 that define the particular plane that contains the pixel of interest, based on the pixel position data 23 as described in greater detail below. The plane may be computed solely from information passed to the texture circuit by the pixel shader, or may be computed based on information from the geometry processing logic that determines the pixels covered by each primitive. Either way, the computed plane specifies the shape of the primitive as seen from the point of view of the light source.

The luminance map memory 26 may be a dedicated memory or may be a portion of the memory 32, accessible by the plane determination circuit 25. The luminance map memory 26 contains a luminance map 36 (FIG. 3c) matrix that contains data used to determine the amount of luminance to be applied to a pixel of interest as described in greater detail below. In an exemplary embodiment, the luminance map 36 contains an array of values corresponding to distances from respective pixels (P0-P2 and I) within an image 50 (FIG. 3a) to a light source 14 (FIG. 3a) as drawn from the point of view of the light source 14.

The render back end circuit 28 may include, for example, blending circuits and any other suitable hardware operative to apply a luminance value to the pixel of interest. The render back end circuit 28 also receives the pixel color information 23 from the pixel shader 22. The render back end circuit 28, in addition to other functions, samples the planar values 27 provided by the plane determination circuit 25 and compares the planar values 27 to the stored values for the distance from the light source of objects in the scene in order to compute the luminance map values 36 (FIG. 3c) maintained in the luminance map memory 26. The luminance map values 27 are then transmitted to the pixel shader 22 for storage and additional processing. The processed pixel data 29 is then transmitted to a memory controller 30, via the render back end circuit 28, which transmits pixel values 31 formatted for subsequent use or display on a suitable display device (not shown) to the memory 32. The operations performed by the graphics processing circuit 20 in determining the luminance value to be applied to a pixel of interest will now be described with reference to FIGS. 3-4.

Figure 3A:
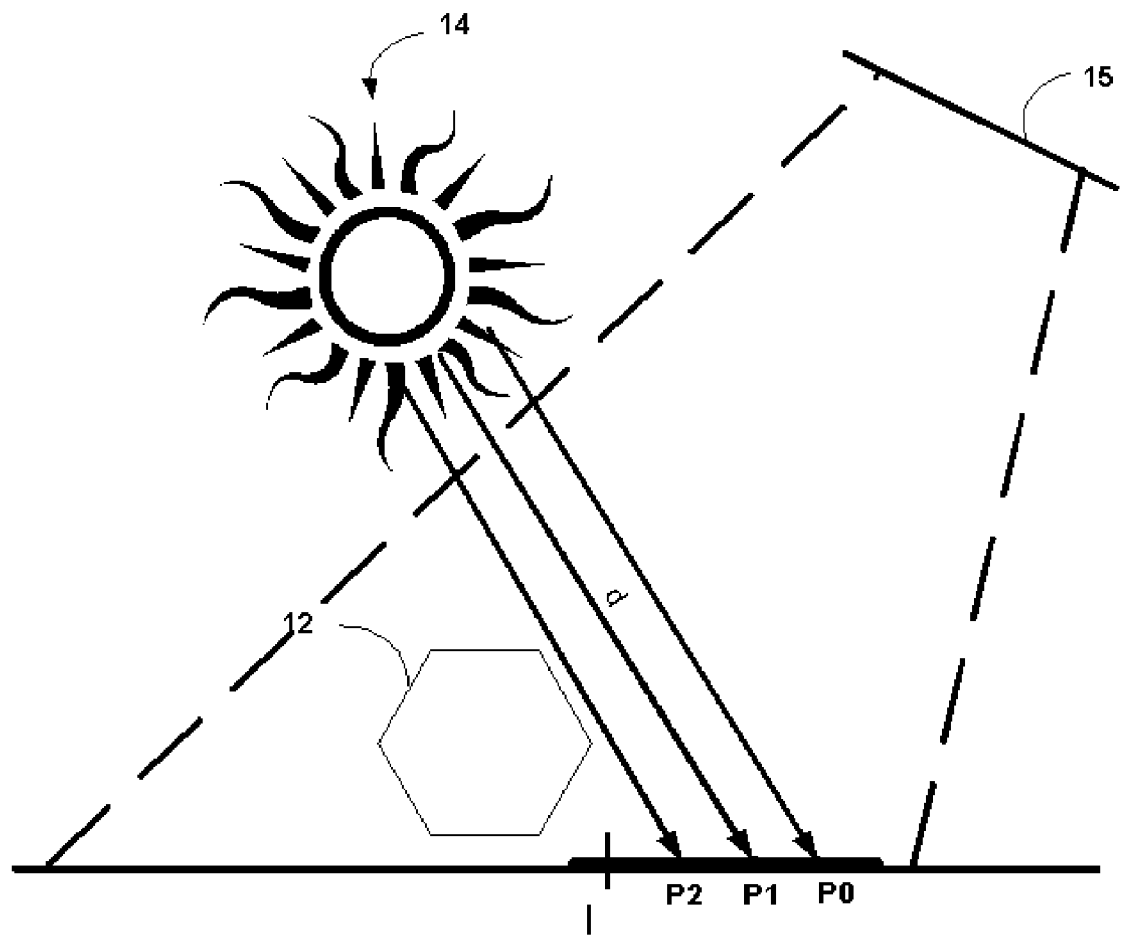
FIG. 3(a) is a representative side view of the luminance determination method employed by a graphics processing circuit illustrated in FIG. 2.
Figure 3B:
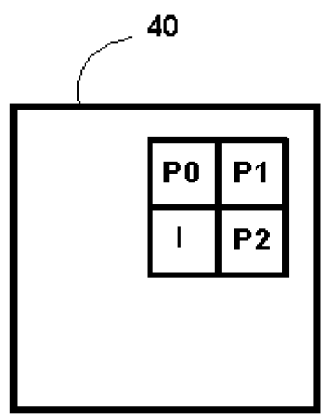
FIG. 3(b) is a schematic representation of the pixel of interest within the larger image in eye space.
Figure 3C:
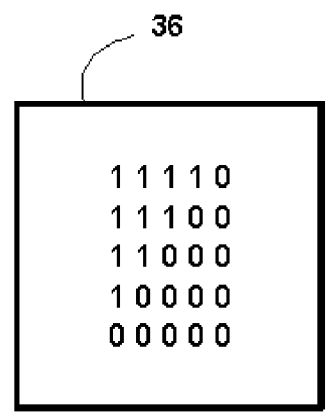
FIG. 3(c) is a schematic representation of an exemplary shadow map employed by the graphics processing circuit illustrated in FIG. 2 for use in determining the luminance value to be applied to the pixel of interest within an image.

FIG. 3(a) is a representative side view of one example of the luminance determination method employed by the graphics processing circuit 20 according to one embodiment of the present invention. An image to be rendered contains an object 12 in the foreground as illuminated by light source 14. The pixel of interest I, lies in shadow from the vantage point of the eye 15 (e.g. eye space) as the object 12 is positioned between the light source 14 and the pixel of interest, I. Thus, if rendered correctly, the pixel of interest I will have a luminance value smaller than, for example, pixel P2 that is not blocked by the object 12, and is therefore, not in shadow. To determine the incoming luminance value of the pixel of interest, I, a plane 40 (FIG. 3(b)), including the pixel of interest I and the pixels (e.g. P0-P2) that neighbor it, in eye space, will be sampled and used to calculate the luminance value to be applied to the pixel of interest I. As is known, the appearance attributes applied to a pixel are determined, at least in part, by the appearance attributes of the pixels that surround it. Thus, the luminance value of the pixel of interest I will be determined, at least in part, by the luminance values of the neighboring pixels P0-P2 within the plane 40.

Figure 4:
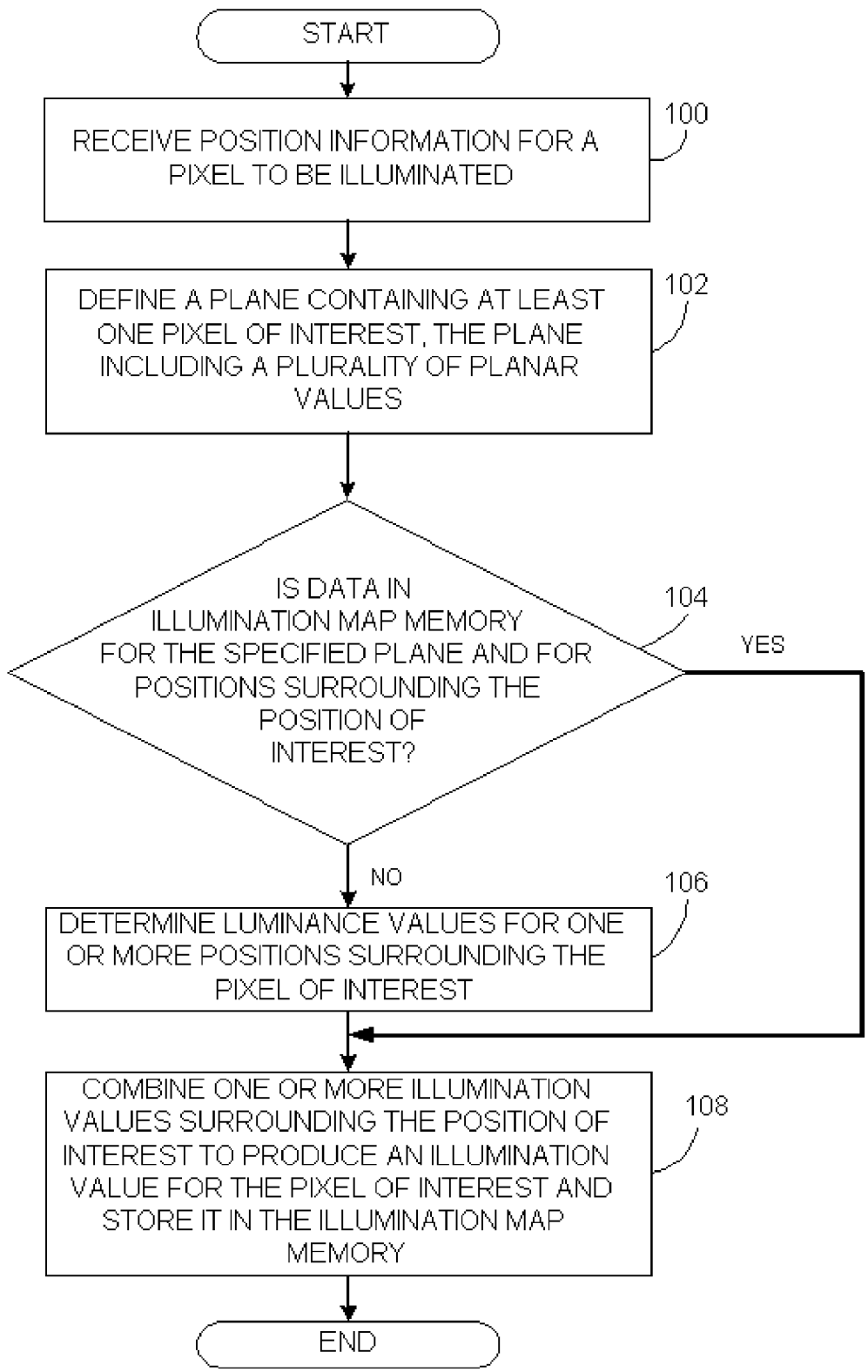
FIG. 4 is a flow chart illustrating the operations performed by the graphics processing circuit when performing the luminance value determination method according to one example of the present invention.

FIG. 4 is a flow chart of the operations performed by the graphics processing circuit 20 (FIG. 2) when determining the luminance value to be applied to a pixel of interest. The process begins at step 100 with the texture block 24 receiving the position information 23 of the pixel of interest (I) and the neighboring pixels from the pixel shader 22.

In step 102, the plane 40 containing the pixel of interest I is defined. This is accomplished by the plane determination circuit 25 receiving the pixel position information 23 and calculating the planar equation:

$$Ax+By+Cz+D=0$$

for the pixel of interest, where variables A, B, and C correspond to the normal of the plane (derived from 1 and the plurality of neighboring pixels P0-P2), and D is a distance factor of that plane to the origin (derived from the normal and one of the points on the plane).

In step 104, a comparison is made between the values maintained in the luminance map memory 26 and the computed plane and the position of the pixel of interest on that plane. If the luminance map memory 26 contains luminance information for that plane for a region surrounding that pixel, then step 106 is skipped. Otherwise, it is necessary to compute the desired luminance information.

In step 106, luminance values surrounding the pixel of interest are determined. This determination is accomplished by the render back end circuitry 28 (FIG. 2) determining whether the predetermined distance specified by the computed plane is greater than the values contained at corresponding positions in the shadow map stored in memory 32. If the distance to the planar position is greater than the corresponding value contained in the map memory, the position is in shadow, else it is illuminated. A plurality of shadow tests may be combined to produce each of a plurality of illumination values on the computed plane. Multiple shadow tests may be combined to form each illumination value by a number of methods known in the art, e.g. box filter, Gaussian filter, etc. Using multiple shadow tests to compute each illumination value provides a smoother transition between the lighter (e.g. illuminated) and darker (e.g. in shadow) portions of the image.

Note that the shadow tests are not necessarily performed at the position of the pixel of interest from step 100. Instead, they are performed at positions for which distances are stored in the shadow map. As a result, the data stored in illumination memory 26 must be further processed to produce an illumination value for the pixel of interest. Also note that the shadow determination test may re-use substantial portions of logic that already exists in the render backend circuit 28 in order to perform standard depth buffering operations, which involve comparing computed distance values to distance values that are stored in memory 32, thus reducing the cost of the implementation.

In step 108 of FIG. 4, luminance values determined for the plane containing the pixel of interest are combined to produce an illumination value for the pixel of interest. This may be done by existing methods known in the art, e.g. bi-linear filtering or higher order filters. In particular, performing this operation in the texture logic 24 allows existing texture filtering logic to be re-used for producing illumination values for pixels of interest, thus reducing the cost of the implementation.

Note that the illumination map memory 26 in FIG. 2 may be implemented as a full cache or may be replaced by a buffer memory. The former case allows data sharing where illumination is required for multiple pixels of interest that share the same plane, as is likely to happen when computing pixels of interest within a planar primitive. The latter case allows simpler implementation, at the cost of potentially increased computation. Also note that the plane specified with the pixel of interest could be specified many different ways, or could be replaced with a higher order non-planar surface. The essential element is that the position of the pixel of interest includes information that specifies the orientation of the surface that contains it, hence shadow tests may be performed without the self-shadowing artifacts described above.

As noted above, the above operations may be carried out by one or more suitably programmed processing devices that may execute instructions stored on suitable storage media, including, but not limited to, RAM, ROM, optical storage media or any other suitable media that stores digital information for processing to carry out the above operations. The storage media may be distributed media accessible via online connection, local, or any other suitable storage media.

The above detailed description of the invention and the examples described therein have been provided for the purposes of illustration and description. Although an exemplary embodiment of the present invention has been described in detail herein with reference to the accompanying drawings, it is to be understood that the present invention is not limited to the embodiment disclosed, and that various changes and modifications to the invention are possible in light of the above teaching. Accordingly, the scope of the present invention is to be defined by the claims appended hereto.

What is claimed is:

1. A pixel illumination method carried out by a graphics proccessing device, comprising:
   receiving position information for at least one pixel of interest using the graphics processing device;
   defining a plane containing the at least one pixel of interest, the plane being defined by a plurality of planar values;
   comparing the plurality of planar values to a corresponding set of shadow map distance values;
   determining a first luminance value for the plane based on the comparison of the plurality of planar values to the corresponding set of shadow map distance values;
   determining a second luminance value for the at least one pixel of interest based on the first luminance value; and
   applying the second luminance value to the at least one pixel of interest.

2. The pixel illumination method of claim 1, wherein the luminance value is determined by:
   determining distances between a light source and a plurality of locations near the at least one pixel of interest;
   comparing the distances to a predetermined set of values; and
   computing the second luminance value based on the comparison of the distances.

3. The pixel illumination method of claim 2, wherein the predetermined set of values comprise shadow map values that are provided in response to the light source.

4. The pixel illumination method of claim 1, wherein the plane containing the at least one point of interest is determined based on a plurality of pixels that neighbor the pixel of interest.

5. The pixel illumination method of claim 1, wherein the second luminance value is determined by applying the planar values to a NxN matrix.

6. A graphics processing circuit, comprising:
   a pixel shader operative to provide pixel position information for at least one pixel of interest in response to image data representing a scene to be rendered;
   a texture circuit, coupled to the pixel shader, operative to determine a luminance value to be applied to the at least one pixel of interest, wherein the luminance value is determined by:
   defining a plane containing the at least one pixel of interest, wherein the plane is defined by a plurality of planar values;
   comparing the plurality of planar values to a corresponding set of shadow map distance values; and
   determining a first luminance value for the plane based on the comparison of the plurality of planar values to the corresponding set of shadow map distance values;
   determining a second luminance value for the at least one pixel of interest based on the first luminance value; and
   a render back end circuit, coupled to the texture circuit, operative to apply the second luminance value to the pixel of interest.

7. The graphics processing circuit of claim 6, wherein the texture circuit comprises a plane determination circuit operative to determine the plane containing the at least one pixel of interest based on a plurality of pixels that neighbor the at least one pixel of interest.

8. The graphics processing circuit of claim 7, further comprising a luminance map memory, coupled to the plane determination circuit, that is operative to store a matrix of predetermined values used to determine a relative weight of the second luminance value based on the plurality of pixels that neighbor the at least one pixel of interest.

9. The graphics processing circuit of claim 7, wherein the plane is determined based on a distance between the at least one pixel of interest and a light source of the image.

10. A non-transitory storage media comprising:
    executable instructions that when executed by one or more processing devices, causes the one or more processing devices to:
    receive position information for at least one pixel of interest to be rendered
    define a plane containing the at least one pixel of interest, the plane being defined by a plurality of planar values;
    compare the plurality of planar values to a corresponding set of shadow map distance values;
    determine a first luminance value for the plane based on the comparison of the plurality of planar values to the corresponding set of shadow map distance values;
    determine a second luminance value for the at least one pixel of interest based on the first luminance value; and
    apply the second luminance value to the at least one pixel of interest.

11. The non-transitory storage media of claim 10 that contains executable instructions that cause the one or more processing devices to:
    determine distances between a light source and a plurality of locations near the at least one pixel of interest;
    compare the distances to a predetermined set of values; and
    compute the second luminance value based on the comparison of the distances.

* * * * *